United States Patent
Sullivan et al.

(10) Patent No.: US 8,799,978 B2
(45) Date of Patent: Aug. 5, 2014

(54) SYSTEM AND METHOD OF MANAGING VIDEO STREAMS TO A SET TOP BOX

(75) Inventors: Marc A. Sullivan, Austin, TX (US); Philip T. Kortum, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 366 days.

(21) Appl. No.: 12/847,710

(22) Filed: Jul. 30, 2010

(65) Prior Publication Data

US 2010/0299693 A1    Nov. 25, 2010

Related U.S. Application Data

(63) Continuation of application No. 11/207,567, filed on Aug. 19, 2005, now Pat. No. 7,793,317.

(51) Int. Cl.
*H04H 60/32* (2008.01)
*H04N 7/173* (2011.01)

(52) U.S. Cl.
USPC .......... 725/120; 725/14; 725/89; 725/97

(58) Field of Classification Search
USPC .................................................. 725/14
See application file for complete search history.

(56) References Cited

U.S. PATENT DOCUMENTS

| | | | |
|---|---|---|---|
| 4,808,992 A | 2/1989 | Beyers, Jr. et al. | |
| 5,488,409 A * | 1/1996 | Yuen et al. | 725/41 |
| 5,541,738 A * | 7/1996 | Mankovitz | 386/245 |
| 5,583,561 A * | 12/1996 | Baker et al. | 725/93 |
| 5,822,123 A * | 10/1998 | Davis et al. | 725/43 |
| 5,930,252 A * | 7/1999 | Aaker et al. | 370/395.2 |
| 6,173,112 B1 * | 1/2001 | Gruse et al. | 386/291 |
| 6,344,878 B1 * | 2/2002 | Emura | 348/460 |
| 6,522,342 B1 * | 2/2003 | Gagnon et al. | 715/716 |
| 6,570,606 B1 * | 5/2003 | Sidhu et al. | 348/14.1 |
| 6,574,794 B1 * | 6/2003 | Sarraf | 725/63 |
| 6,816,909 B1 * | 11/2004 | Chang et al. | 709/231 |
| 7,149,415 B2 * | 12/2006 | Thiagarajan et al. | 386/265 |
| 7,171,677 B1 * | 1/2007 | Ochiai | 725/80 |
| 7,356,246 B1 | 4/2008 | Kobb | |
| 7,460,546 B2 * | 12/2008 | Anderson, IV | 370/401 |
| 7,472,197 B2 * | 12/2008 | Li et al. | 709/231 |

(Continued)

FOREIGN PATENT DOCUMENTS

WO    2004057862 A1    7/2004

OTHER PUBLICATIONS

Non-Final Office Action for U.S. Appl. No. 11/207,567 mailed Jul. 15, 2008, 14 pages.

(Continued)

*Primary Examiner* — Brian T Pendleton
*Assistant Examiner* — Jonathan V Lewis
(74) *Attorney, Agent, or Firm* — Toler Law Group, PC

(57) ABSTRACT

A particular method includes determining whether a recording at a set top box is in progress. When the recording is in progress, a program provided by a video stream transmitted to the set top box is recorded. After the recording is complete, a request is automatically sent to a content source to turn off the video stream. When the recording is not in progress, a warning is transmitted for display at a display device that the video stream will be turned off after a timeout period. After the timeout period has elapsed, the request is automatically sent to the content source to turn off the video stream.

18 Claims, 4 Drawing Sheets

(56) References Cited

U.S. PATENT DOCUMENTS

| | | | |
|---|---|---|---|
| 7,500,261 B1* | 3/2009 | Myers | 725/105 |
| 7,730,511 B2* | 6/2010 | Sano et al. | 725/58 |
| 7,877,766 B1* | 1/2011 | Wu et al. | 725/22 |
| 7,895,615 B1* | 2/2011 | Godwin | 725/28 |
| 8,156,528 B2* | 4/2012 | Baumgartner et al. | 725/58 |
| 8,239,901 B2* | 8/2012 | Takeshima et al. | 725/94 |
| 2002/0059588 A1 | 5/2002 | Huber et al. | |
| 2003/0009772 A1 | 1/2003 | Karr | |
| 2004/0221313 A1* | 11/2004 | Depietro et al. | 725/105 |
| 2004/0252247 A1* | 12/2004 | Wabiszczewicz | 348/734 |
| 2004/0261126 A1* | 12/2004 | Addington et al. | 725/135 |
| 2005/0034171 A1* | 2/2005 | Benya | 725/143 |
| 2005/0076371 A1* | 4/2005 | Nakamura | 725/75 |
| 2005/0157215 A1* | 7/2005 | Minnick et al. | 348/725 |
| 2005/0183120 A1* | 8/2005 | Jain et al. | 725/46 |
| 2005/0188416 A1* | 8/2005 | Halna Du Fretay et al. | 725/117 |
| 2005/0190794 A1* | 9/2005 | Krause et al. | 370/485 |
| 2005/0216951 A1* | 9/2005 | MacInnis | 725/135 |
| 2005/0229226 A1* | 10/2005 | Relan et al. | 725/114 |
| 2005/0240872 A1* | 10/2005 | Roeske | 715/716 |
| 2005/0278759 A1* | 12/2005 | Unger | 725/89 |
| 2006/0026654 A1* | 2/2006 | An et al. | 725/89 |
| 2006/0031888 A1 | 2/2006 | Sparrell | |
| 2006/0064721 A1* | 3/2006 | Del Val et al. | 725/41 |
| 2006/0064729 A1 | 3/2006 | Steading | |
| 2006/0130105 A1* | 6/2006 | Simmons, Jr. et al. | 725/105 |
| 2006/0277577 A1* | 12/2006 | Kiiskinen et al. | 725/62 |
| 2011/0126246 A1* | 5/2011 | Thomas et al. | 725/93 |

OTHER PUBLICATIONS

Final Office Action for U.S. Appl. No. 11/207,567 mailed Dec. 15, 2008, 14 pages.

Non-Final Office Action for U.S. Appl. No. 11/207,567 mailed May 18, 2009, 11 pages.

Final Office Action for U.S. Appl. No. 11/207,567 mailed Dec. 14, 2009, 13 pages.

Notice of Allowance and Fee(s) Due for U.S. Appl. No. 11/207,567 mailed Jun. 10, 2010, 6 pages.

* cited by examiner

SYSTEM AND METHOD OF MANAGING VIDEO STREAMS TO A SET TOP BOX

CLAIM OF PRIORITY

The present application claims priority from and is a continuation of patent application Ser. No. 11/207,567 filed on Aug. 19, 2005 and entitled "SYSTEM AND METHOD OF MANAGING VIDEO STREAMS TO A SET TOP BOX", the contents of which are expressly incorporated herein by reference in their entirety.

FIELD OF THE DISCLOSURE

The present disclosure relates to set top boxes.

BACKGROUND

In an Internet protocol (IP) environment, a set top box receives an IP video stream, decodes the IP video stream, and delivers the content from the video stream to a television to which the set top box is connected. The delivery of the IP video stream is typically independent of the state of the television. This can create a significant issue for network loading and utilization. For example, if a customer finishes watching television and turns the television off, the IP video stream continues to flow to the set top box, even though the television is not actively showing the content from the IP video stream. This can lead to a large amount of unnecessary IP bandwidth consumption since the content from the IP video stream is not being consumed. Further, the "wasted" bandwidth can be significant because it can require additional network components to be used to deliver the service. The additional network components can increase the cost of providing the service.

DETAILED DESCRIPTION

In a particular embodiment, a method includes determining whether a recording at a set top box is in progress. The method also includes, when the recording is in progress, recording a program provided by a video stream transmitted to the set top box and automatically sending a request to a content source to turn off the video stream after the recording is complete. The method further includes, when the recording is not in progress, transmitting a warning for display at a display device that the video stream will be turned off after a timeout period and automatically sending the request to the content source to turn off the video stream after the timeout period has elapsed.

In another particular embodiment, a set top box device includes a processor, a memory device, and a computer program embedded within a computer readable medium. The computer program includes instructions executable by the processor to determine whether a recording at the set top box device is in progress. The instructions are also executable to, when the recording is in progress, record, at the memory device, a program provided by a video stream transmitted to the set top box device. The instructions are further executable to, after the recording is complete, automatically send a request to a content provider to turn off the video stream. The instructions are executable to, when the recording is not in progress, transmit a warning for display at a display device that the video stream will be turned off after a timeout period. The instructions are also executable to, after the timeout period has elapsed, automatically send the request to a content provider to turn off the video stream.

In another particular embodiment, a computer readable storage medium includes instructions that, when executed by a processor, cause the processor to determine whether a recording at a set top box is in progress. The instructions are also executable to, when the recording is in progress, record a program provided by a video stream transmitted to the set top box, and, after the recording is complete, automatically send a request to a content provider to turn off the video stream. The instructions are further executable by the processor to transmit a warning for display at a display device that the video stream will be turned off after a timeout period, and after the timeout period has elapsed, automatically send the request to a content provider to turn off the video stream.

Figure 1:
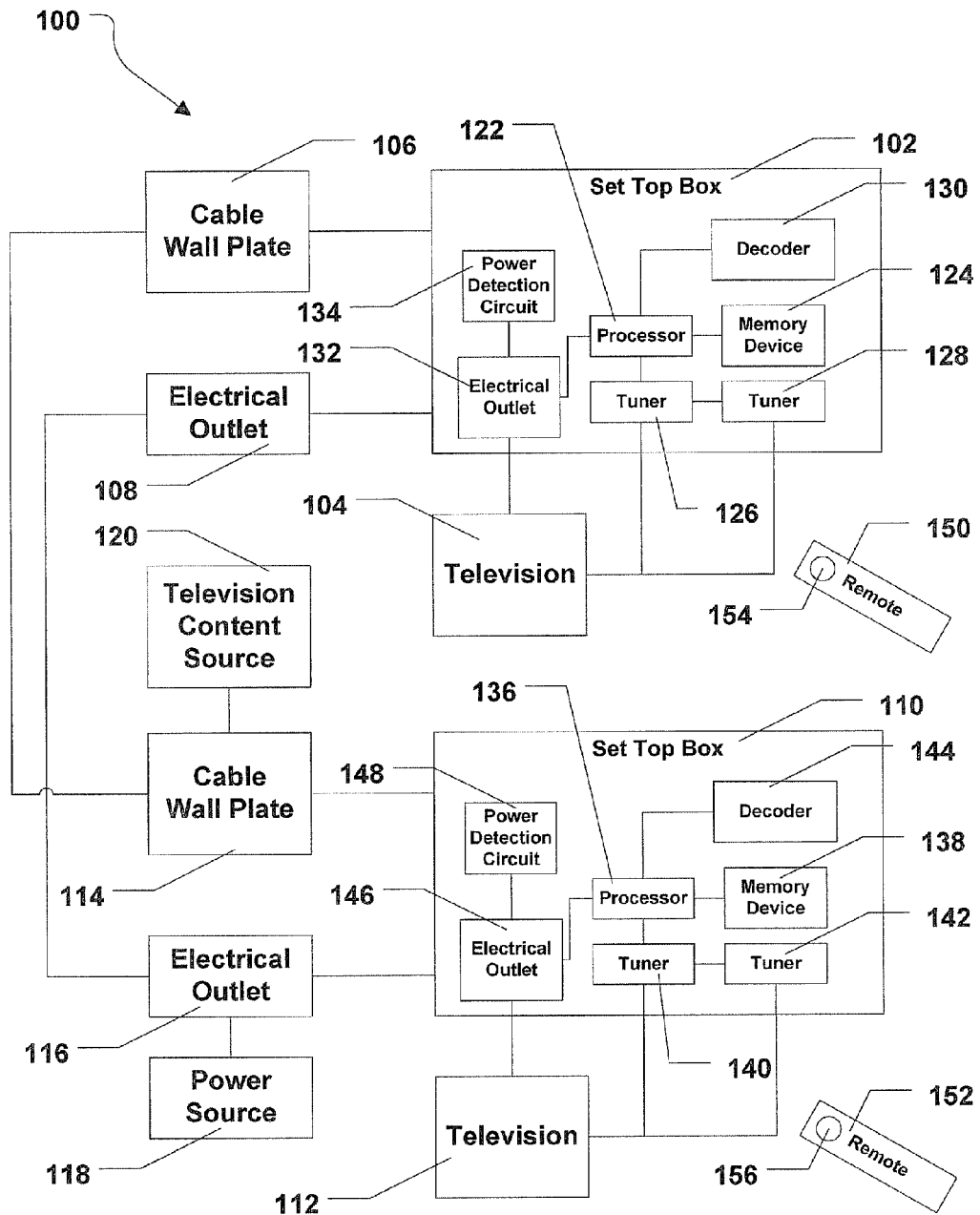
FIG. 1 is a block diagram that is representative of a home entertainment system.

Referring to FIG. 1, a non-limiting, exemplary embodiment of a home entertainment system is shown and is generally designated 100. As illustrated in FIG. 1, the home entertainment system 100 includes a first set top box 102 that is coupled to a first display device, such as a first television 104. Also, the first set top box 102 is coupled to a first cable wall plate 106, and a first electrical outlet 108.

FIG. 1 also shows a second set top box 110 that is coupled to a second display device, e.g., a second television 112. Further, the second set top box 110 is coupled to a second cable wall plate 114, and a second electrical outlet 116. In a particular embodiment, the first set top box 102 and the second set top box 110 may incorporate one or more additional features of the general computing system described below in conjunction with FIG. 4.

In a particular embodiment, each electrical outlet 108, 116 is a standard 110/120 volt alternating current (VAC) outlet. Moreover, as shown in FIG. 1, each electrical outlet 108, 116 is coupled to a power source 118, e.g., a 110/120 VAC power source. Each cable wall plate 106, 114 can include a coaxial cable connection, a category five (CAT-5) connection, a registered jack eleven (RJ-11) type connection, or a combination thereof. Additionally, each cable wall plate 106, 114 can be coupled to each other and to a television content source 120, e.g., a digital television content source, via a coaxial cable, CAT-5 cable, or a telephone cable.

As depicted in FIG. 1, the first set top box 102 can include a processor 122 and a memory device 124 that is coupled to the processor 122. Also, the first set top box 102 can include one or more television tuners 126, 128 that are coupled to the processor 122. Additionally, the first set top box 102 can include a decoder 130 that is coupled to the processor 126. As illustrated in FIG. 1, the first set top box 102 also includes an electrical outlet 132 and a power detection circuit 134. In a particular embodiment, a power cord from the first television 104 can be plugged into the electrical outlet 132 at the first set top box 102. Further, in a particular embodiment, the electrical outlet 132 at the first set top box 102 can be a switched outlet that is turned off when the first set top box 102 is turned off.

FIG. 1 indicates that the second set top box 110 can include a processor 136 and a memory device 138 that is coupled to the processor 136. Also, the second set top box 110 can include one or more television tuners 140, 142 that are coupled to the processor 136. Additionally, the second set top box 110 can include a decoder 144 that is coupled to the processor 136. As illustrated in FIG. 1, the second set top box 110 also includes an electrical outlet 146 and a power detection circuit 148. In a particular embodiment, a power cord from the second television 112 can be plugged into the electrical outlet 146 at the second set top box 110. Also, in a particular embodiment, the electrical outlet 146 at the second set top box 110 can be a switched outlet that can be turned off when the second set top box 110 is turned off.

In a particular embodiment, within each set top box 102, 110, the processor 122, 136 can access the memory device 124, 138, for example, to read television content from and write television content to the memory device 124, 138. Each memory device 124, 138 can be a flash memory device or any other type of electrically erasable, programmable, read only memory (EEPROM) device or non-volatile memory device, such as a hard disk drive. Also, each memory device 124, 138 can be a random access memory (RAM) device. In a particular embodiment, each power detection circuit 134, 148 can detect when a television 104, 112 that is receiving power via each set top box 102, 110 is powered on to an operation mode or is powered down to a standby mode or a power off mode.

FIG. 1 also shows a first remote control device 150 and a second remote control device 152. In a particular embodiment, the first remote control device 150 can communicate with the first set top box 102 and the first television 104. Also, the second remote control device 152 can communicate with the second set top box 110 and the second television 112. In an illustrative embodiment, the remote control devices 150, 152 can communicate using infrared (IR) signals. In a particular embodiment, each remote control device 150, 152 can include a global power button 154, 156. When the global power button 154, 156 is pressed, the set top box 102, 110 and the television 104, 112 that are responsive to the remote control device 150, 152 can be turned off or placed in a low power mode, e.g., a standby mode. Also, the global power button 154, 156 can be used to turn on the television 104, 112 and the set top box 102, 110. Further, depending on the state of each television 104, 112, each set top box 102, 110 can request that the content source 120 turn off one or more video streams to each set top box 102, 110. Table 1 illustrates a state table showing the exemplary results based on the state of each television 104, 112 and the action taken by a user.

In a particular embodiment, each television 104, 112 may be turned on for a game system, a digital video disk (DVD) player, a video cassette recorder (VCR), or another video related device. In such a case, the set top box 102, 110 may not be turned on. As such, the video stream to the set top box 102, 110 may not be requested from the content provider.

TABLE 1

Exemplary results based on the state of a TV and user actions.

| State of Television | User Action | Result |
| --- | --- | --- |
| ON | Use remote to turn STB off. | STB switches off power to TV. Video stream turned off. |
| ON | User global power button to turn off STB and TV. | STB and TV turned off. Video stream turned off. |
| ON | Turn TV off directly. | STB detects power off. Video stream turned off. |
| OFF | Use remote to turn STB on. | STB switches power on to TV. Video stream turned on. |
| OFF | Use global power button to turn on STB and TV. | STB and TV turned on. Video stream turned on. |
| OFF | STB turned on. TV turned on directly. | STB detects power on. Video stream turned on. |

Figure 2:
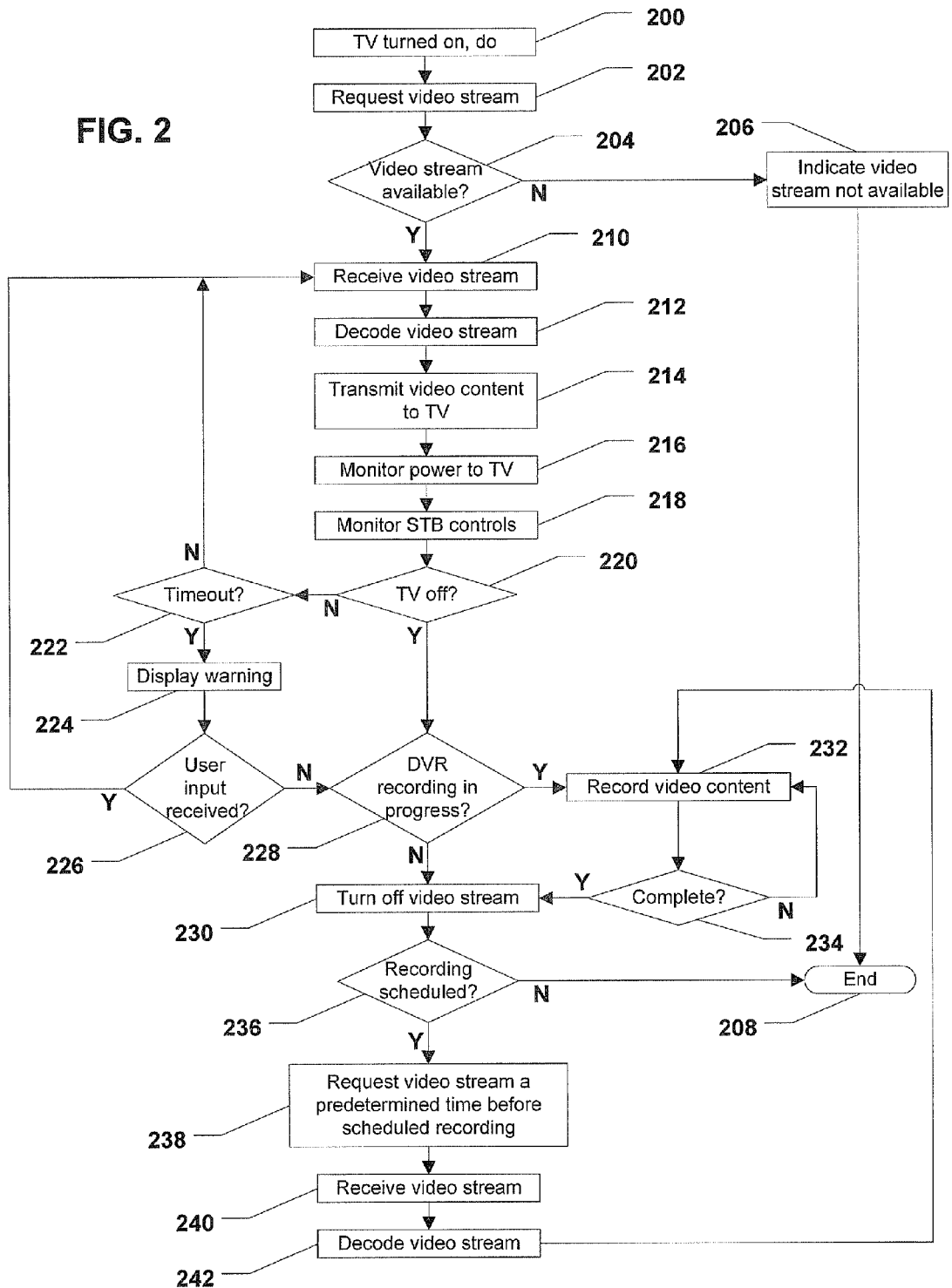
FIG. 2 is a flow chart illustrating a method of managing video streams.

Referring to FIG. 2, a method of managing video streams is depicted and commences at block 200. At block 200, when a television coupled to a set top box is turned on, the set top box, e.g., a program within the set top box, performs the following steps. At block 202, the set top box requests a video stream from a content provider. Moving to decision step 204, the set top box determines whether a video stream is available, e.g., based on the available bandwidth to the set top box. For example, a particular set top box may only have bandwidth available for four video streams. As such, if all four video streams are transmitted to a customer premise, e.g., to two set top boxes, and a user requests a fifth video stream, e.g., at a third set top box, the third set top box can determine that a video stream is not available. At decision step 204, when a video stream is not available, the method proceeds to block 206 and the set top box indicates that a video stream is not available. The method then ends at state 208.

Returning to decision step 204, when a video stream is available, the method proceeds to block 210 and the set top box receives the video stream from the content provider. Proceeding to block 212, the set top box decodes the video stream. At block 214, the set top box transmits video content to a television coupled to the set top box. Moving to block 216, the set top box monitors the power to the television. In a particular embodiment, the set top box can monitor the power to the television using a power detection circuit coupled to an outlet into which a power cord from the television is plugged. At block 218, the set top box monitors a plurality of set top box controls, e.g., volume up, volume down, channel up, channel down, pause, stop, rewind, fast forward, play, record, etc.

Continuing to decision step 220, the set top box determines whether the television is turned off. If the television is not turned off, the method proceeds to decision step 222 and the set top box determines whether a timeout has occurred. For example, if a user does not access any of the set top box controls for a predetermined period of time, e.g., four hours, a timeout can occur. In a particular embodiment, a timeout can be an indication that a user is not watching a television that is turned on. At decision step 222, if a timeout does not occur, the method returns to block 210 and continues as depicted. On the other hand, at decision step 222, when a timeout occurs, the method moves to block 224 and the set top box displays a warning at the television. For example, the warning can indicate to a user that a video stream will be turned off due to inactivity at the set top box and that the user can press any button on a remote control to prevent the video stream from being turned off.

Proceeding to decision step 226, the set top box determines whether a user input is received. If a user input is received, the method returns to block 210 and continues as illustrated. Conversely, at decision step 226, if no user input is received, the method continues to decision step 228. Decision step 228 can also be reached from decision step 220 when the set top box determines that the television is turned off.

At decision step 228, the set top box determines whether a recording by a digital video recorder is in progress. If a recording is not in progress, the method proceeds to block 230 and the video stream is turned off. In a particular embodiment, the video stream is turned off by a content source, or content provider, in response to a request by the set top box to have the video stream turned off.

At decision step 228, when a recording is in progress, the method moves to block 232 and the set top box continues to record the video content from the video stream. Thereafter, at decision step 234, the set top box determines whether the recording is complete. If the recording is not complete, the method returns to block 232 and continues as shown. When the recording is complete, the method proceeds to block 230 and the video stream is turned off.

Moving to decision step 236, the set top box determines whether a recording is scheduled. If no recording is scheduled, the method ends at state 208. On the other hand, if a recording is scheduled, the method continues to block 238 and the set top box requests a video stream from a content provider at a predetermined time before the scheduled recording. In a particular embodiment, the video stream can be requested within five minutes or less of the scheduled recording. At block 240, the set top box receives the video stream from the content provider. Next at block 242, the set top box decodes the video stream. The method then proceeds to block 232 and continues as described.

Figure 3:
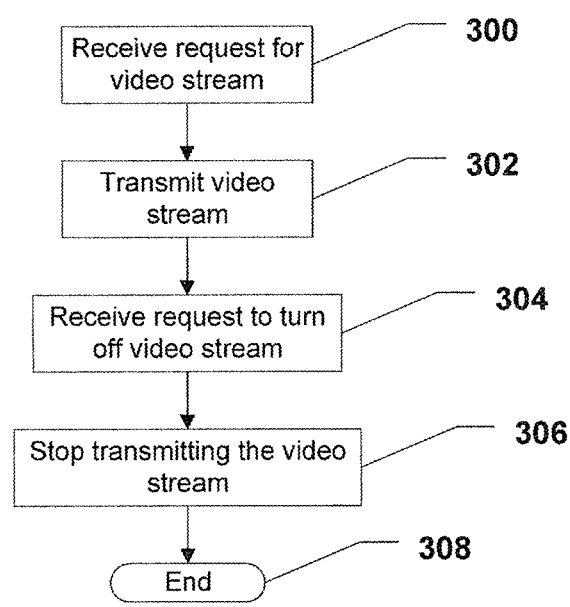
FIG. 3 is a flow chart illustrating another method of managing video streams.

FIG. 3 illustrates another method of managing video streams. At block 300, a content provider, or content source, receives a request for a video stream, e.g., from a set top box after the set top box is turned on. At block 302, the content provider transmits a video stream to the set top box.

Moving to block 304, the content provider receives a request from a set top box to turn off, or stop the transmission, of the video stream. At block 306, the content provider stops transmitting the video stream to the set top box. The method then ends at state 308.

Figure 4:
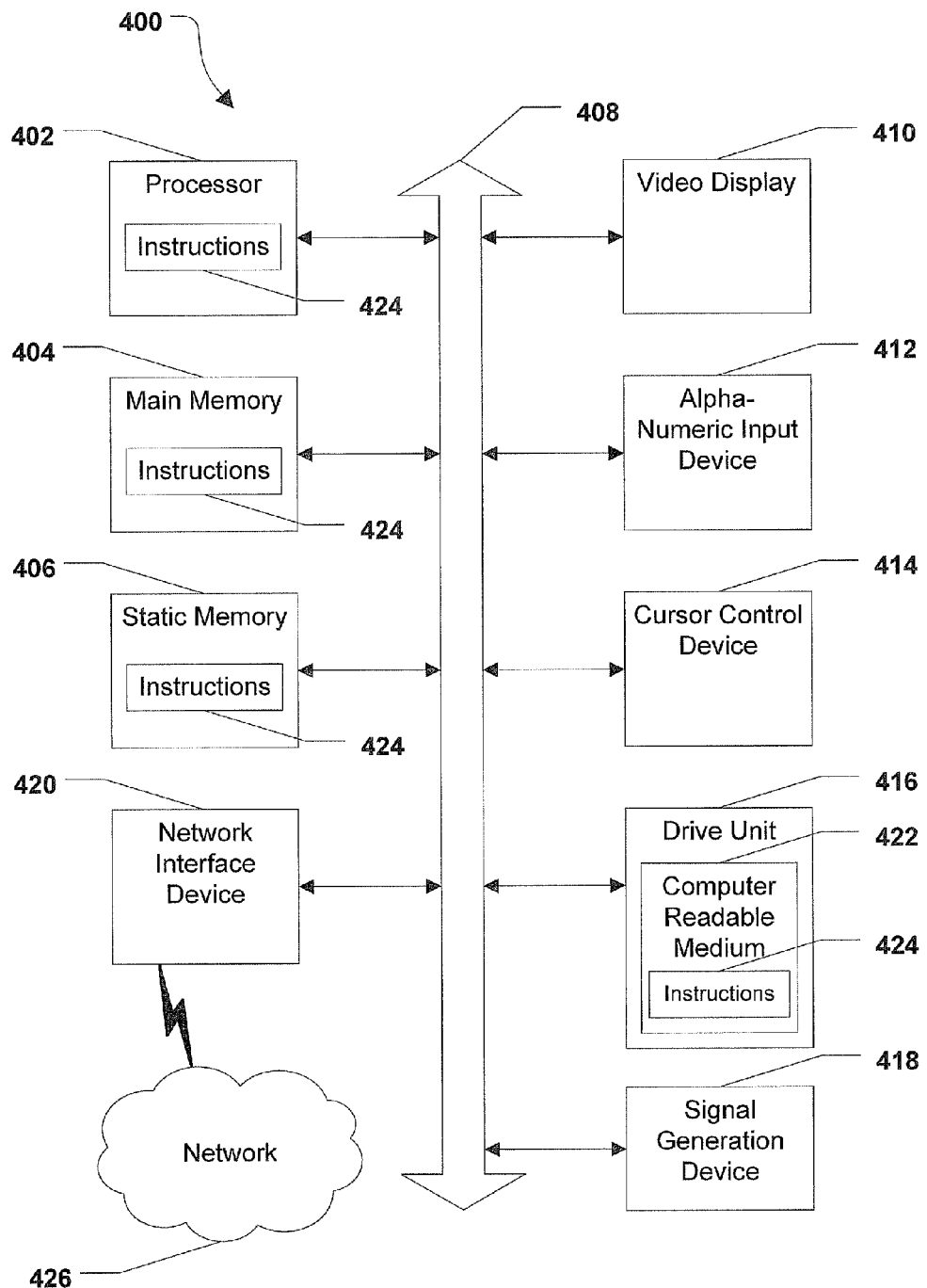
FIG. 4 is a block diagram that is representative of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of managing video streams at a set top box provides a way for a set top box to request that one or more video streams to the set top box be turned off when a television coupled to the set top box is not turned on and a recording by a digital video recorder is not in progress. As such, an amount of bandwidth that is wasted within a system that provides video streams to plural set top boxes can be reduced.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
  determining whether a recording at a set top box is in progress;
  when the recording is in progress:
    recording a program provided by a video stream transmitted to the set top box; and
    in response to determining that the recording is complete, automatically sending a request from the set top box to a content source distinct from the set top box to stop sending the video stream to the set top box;
  when the recording is not in progress:
    transmitting a warning for display at a display device that the video stream will be turned off after a timeout period; and
    in response to the timeout period elapsing, automatically sending the request to the content source distinct from the set top box to stop sending the video stream to the set top box; and
  in response to determining that a second recording is scheduled at the set top box:
    sending a second request to the content source to provide a second video stream; and
    after the second recording is completed, sending a third request to the content source to stop sending the second video stream to the set top box.

2. The method of claim 1, further comprising, when the recording is not in progress:
  determining whether a set top box control is selected within the timeout period, and
  when the set top box control is selected, refraining from sending the request to the content source to stop sending the video stream.

3. The method of claim 2, wherein the set top box control comprises one of a volume up control, a volume down control, a channel up control, a channel down control, a fast forward control, a reverse control, a play control, a pause control, a stop control, and a record control.

4. The method of claim 1, wherein the second request includes a request to send the second video stream.

5. The method of claim 1, further comprising:
  receiving the second video stream before the second recording is scheduled;
  decoding the second video stream before the second recording is scheduled; and
  recording the second video stream.

6. The method of claim 1, further comprising:
  determining that the display device coupled to the set top box is in a normal power mode;
  requesting the video stream from the content source;
  receiving the video stream;
  decoding the video stream; and
  transmitting the decoded video stream to the display device.

7. The method of claim 1, wherein the content source comprises a digital television content source, wherein the content source is associated with a content provider, or any combination thereof.

8. A system, comprising:
a processor; and
a memory device that stores instructions that, when executed by the processor, cause the processor to perform operations comprising:
determining whether a recording at a set top box is in progress;
when the recording is in progress:
recording, at the memory device, a program provided by a video stream transmitted to the set top box; and
in response to determining that the recording is complete, automatically sending a request from the set top box to a content source distinct from the set top box to stop sending the video stream;
when the recording is not in progress:
transmitting a warning for display at a display device that the video stream will be turned off after a timeout period; and
in response to the timeout period elapsing, automatically sending the request to the content source distinct from the set top box to stop sending the video stream to the set top box; and
in response to determining that a second recording is scheduled at the set top box:
sending a second request to the content source to provide a second video stream; and
after the second recording is completed, sending a third request to the content source to stop sending the second video stream to the set top box.

9. The system of claim 8, further comprising a power outlet to which the display device is coupled and a power detection circuit coupled to the power outlet.

10. The system of claim 9, wherein the operations further include sending a request to the content source to stop sending at least one video stream to the set top box in response to the power detection circuit detecting that the display device is turned off.

11. The system of claim 10, wherein the operations further include requesting the at least one video stream from the content source when the set top box is turned on and in response to the power detection circuit detecting that the display device is turned on.

12. The system of claim 8, further comprising a plurality of tuners.

13. The system of claim 8, wherein the operations further include, when the recording is not in progress:
determining whether a set top box control is selected within the timeout period, and
when the set top box control is selected, not sending the request to the content source to stop sending the video stream.

14. The system of claim 13, wherein the set top box control is selectable via a remote control associated with the set top box.

15. A computer readable storage device comprising instructions that, when executed by a processor, cause the processor to operations including:
determining whether a recording at a set top box is in progress;
when the recording is in progress:
recording a program provided by a video stream transmitted to the set top box; and
in response to determining that the recording is complete, automatically sending a request from the set top box to a content source distinct from the set top box to stop sending the video stream;
when the recording is not in progress:
transmitting a warning for display at a display device that the video stream will be turned off after a timeout period; and
in response to the timeout period elapsing, automatically sending the request to the content source distinct from the set top box to stop sending the video stream to the set top box; and
in response to determining that a second recording is scheduled at the set top box:
sending a second request to the content source to provide a second video stream; and
after the second recording is completed, sending a third request to the content source to stop sending the second video stream to the set top box.

16. The computer readable storage device of claim 15, wherein the second request includes a request to send the second video stream a predetermined time before the second recording is scheduled.

17. The computer readable storage device of claim 15, wherein the operations further include:
receiving the second video stream before the second recording is scheduled;
decoding the second video stream before the second recording is scheduled; and
recording the second video stream.

18. The computer readable storage device of claim 15, wherein the second video stream is recorded to one of a memory device comprising a flash memory device, an electrically erasable programmable read only memory device, a non-volatile memory device, and a random access memory device.

* * * * *